United States Patent [19]
Dumas et al.

[11] Patent Number: 4,850,652
[45] Date of Patent: Jul. 25, 1989

[54] FEED CIRCUIT FOR RAILWAY BRAKING SYSTEMS

[75] Inventors: Jean-Claude Dumas, Soisy Sous Montmorency; Alain Van Hemelryck, Bondy, both of France

[73] Assignee: Societe Anonyme dite: Alsthom, Paris, France

[21] Appl. No.: 168,012

[22] Filed: Mar. 14, 1988

[30] Foreign Application Priority Data

Mar. 13, 1987 [FR] France ................. 87 03455

[51] Int. Cl.$^4$ ................. B60T 13/46; B60T 17/02; B61H 11/14
[52] U.S. Cl. ................. 303/12; 188/356; 303/86
[58] Field of Search ................. 303/10-12, 303/86; 417/174, 187, 151, 85, 86; 188/356

[56] References Cited

U.S. PATENT DOCUMENTS

| | | | |
|---|---|---|---|
| 2,705,870 | 4/1955 | Holton | 303/12 |
| 2,721,629 | 10/1955 | Saussard | 188/356 |
| 2,967,392 | 1/1961 | Stelzer | 303/12 |
| 3,003,823 | 10/1961 | Williams | 303/12 |
| 3,008,747 | 11/1961 | Lytle | 303/12 X |
| 3,114,498 | 12/1963 | Glass | 303/12 X |
| 3,407,008 | 10/1968 | May | 303/12 |
| 4,549,854 | 10/1985 | Yamamoto | 294/64.2 X |
| 4,759,691 | 7/1988 | Kroupa | 417/174 |

FOREIGN PATENT DOCUMENTS

| | | |
|---|---|---|
| 0129307 | 12/1984 | European Pat. Off. |
| 84848 | 4/1920 | Switzerland . |
| 352972 | 7/1931 | United Kingdom . |

Primary Examiner—Douglas C. Butler
Attorney, Agent, or Firm—Sughrue, Mion, Zinn, Macpeak & Seas

[57] ABSTRACT

A feed circuit for feeding a railway train braking system and usable in conjunction with a compressed air system or with a vacuum system, the feed circuit including an air compressor (1) and being characterized in that it further includes a static vacuum pump (14) powered by the compressed air delivered by the compressor.

3 Claims, 1 Drawing Sheet

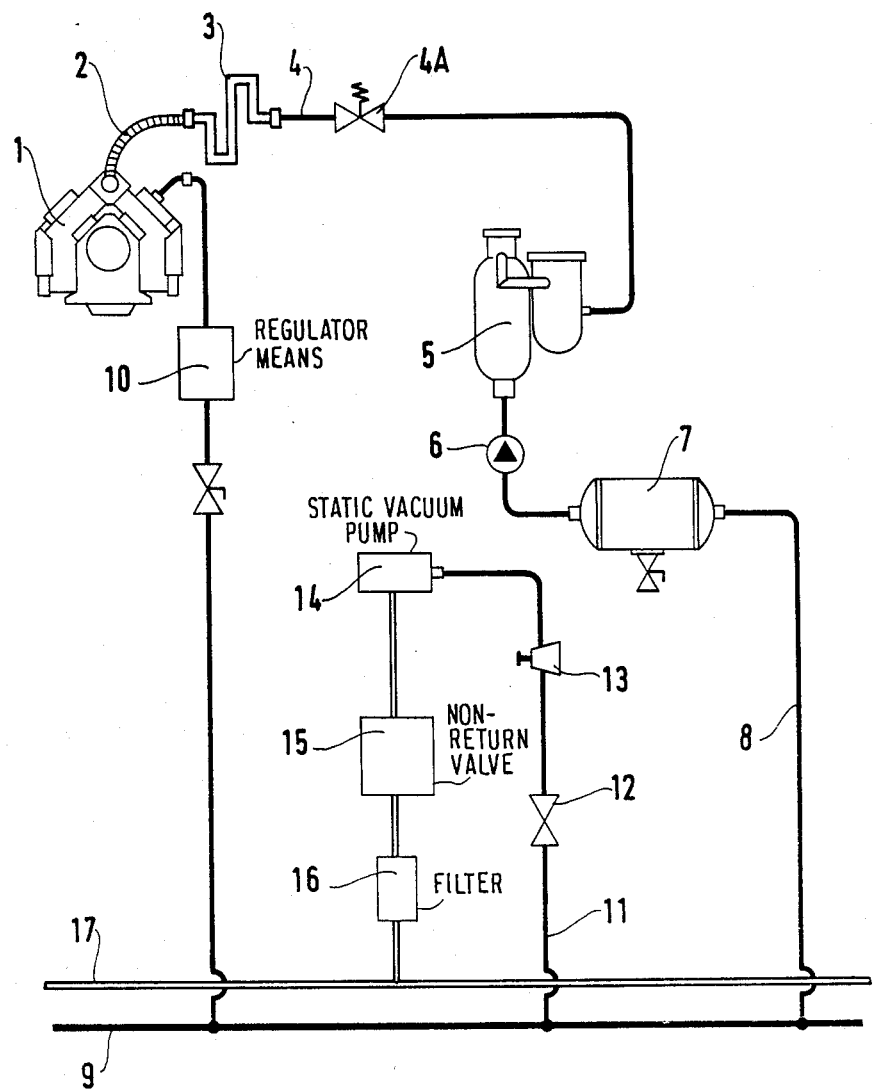

FEED CIRCUIT FOR RAILWAY BRAKING SYSTEMS

The present invention relates to a feed circuit for feeding a railway train braking system, including an air compressor and providing either compressed air or else a vacuum.

BACKGROUND OF THE INVENTION

Although locomotives are always fitted with compressed air braking systems, a portion of the rolling stock available on some railway networks is still fitted with vacuum brakes while the remainder has compressed air brakes. The locomotives in use on these networks must therefore be capable of providing braking for trains fitted with vacuum brakes or for trains fitted with compressed air brakes. Since the flow rate of available vacuum pumps is limited, it is sometimes necessary to provide a locomotive with two vacuum pumps in addition to a compressor. This means that a locomotive needs three piston apparatuses to be installed thereon, which can give rise to problems of mass, of bulk, and of cost. These three apparatuses together with associated means are bulky, and they become difficult to drive using pulleys and belts within the restricted space available.

The object of the present invention is to provide a feed circuit for railway braking systems which can be used equally well with trains made up of rolling stock braked by compressed air or with trains made up of rolling stock braked by vacuum, with said feed circuit being more compact and lighter than prior circuits, and additionally reducing vibration and reducing maintenance operations.

SUMMARY OF THE INVENTION

The present invention provides a feed circuit for feeding a railway train braking system and usable in conjunction with a compressed air system or with a vacuum system, the feed circuit comprising an air compressor and a vacuum pump which is a static pump and which is powered by compressed air delivered by the compressor.

BRIEF DESCRIPTION OF THE DRAWING

A feed circuit for railway braking systems for mounting on a locomotive and for use with rolling stock that is braked by a compressed air system or else by a vacuum system is described below by way of example and with reference to the sole diagrammatic FIGURE of the accompanying drawing.

MORE DETAILED DESCRIPTION

A high capacity compressor 1 is connected by a hose 2 to a cooler 3 and then via a duct 4 fitted with a safety valve 4A to an air dryer 5. The air dryer feeds a compressed air supply tank 7 via a retaining nonreturn valve 6.

This makes it possible to reduce the frequency of compressor operation. The tank 7 feeds the main compressed air duct 9 via a connection pipe 8, with said main duct feeding the locomotive brakes with compressed air and also, optionally serving to feed the braking circuit of the train.

Regulator means 10 connected to the compressed air duct serve to start up the compressor whenever the pressure in the duct falls below a minimum value.

In addition, the compressed air duct feeds a static vacuum pump 14 via a pipe 11, a valve 12, and an expander 13. the static vacuum pump does not include any moving parts and as a result it produces much less noise and vibration than does a piston pump. In addition it is compact. The vacuum pump is connected via an interrupting non-return valve 15, and a filter 16 to the general vacuum duct 17 suitable for connection to the vacuum-braked rolling stock of some trains.

We claim:

1. A railway braking system feed circuit for mounting on a locomotive for use with rolling stock braked by compressed air or by vacuum, said feed circuit comprising a main compressed air duct for feeding locomotive brakes and a compressed air braking circuit of a train,
   a general vacuum duct for connection to a vacuum-brake rolling stock of a train,
   a high capacity air compressor,
   a compressed air supply tank,
   a first piping means delivering compressed air from said compressor to said compressed air supply tank,
   second piping means for delivering compressed air from said supply tank to said main compressed air duct,
   a static vacuum pump having no moving parts,
   a third piping means for supplying compressed air from said main compressed duct to said static vacuum pump, and
   a fourth piping means including a non-return valve supplying vacuum to said general vacuum duct whereby, the feed circuit for a railway braking systems can be used equally well with trains made up of rolling stock braked by compressed air or those made up of rolling stock braked by vacuum, which is highly compact, light in weight and with reduced vibration and maintenance.

2. A feed circuit according to claim 1, further comprising a compressor regulation means connected to said air compressor and connected to said main compressed air duct and responsive to pressure within said main compressed air duct for starting up the compressed air compressor when the pressure in the main compressed air duct falls below a minimum value.

3. A feed circuit according to claim 1, wherein said third piping means includes in order a control valve and an expander in order from said main compressed air duct to said static vacuum pump for supplying compressed air from said main compressed air duct to the static vacuum pump and wherein, said fourth piping means includes an interrupting non-return valve and a filter between the static vacuum pump and the general vacuum duct to simplify the control of the static vacuum pump and the supply of vacuum the static vacuum pump to the general vacuum duct.

* * * * *